(12) United States Patent
Hancak (10) Patent No.: US 12,442,503 B2
(45) Date of Patent: Oct. 14, 2025

(54) LIGHT GUIDE WITH MULTI-DIRECTIONAL OPTICS

(71) Applicant: North American Lighting, Inc., Paris, IL (US)

(72) Inventor: Matthew Hancak, Farmington Hills, MI (US)

(73) Assignee: North American Lighting, Inc., Paris, IL (US)

( * ) Notice: Subject to any disclaimer, the term of this patent is extended or adjusted under 35 U.S.C. 154(b) by 0 days.

(21) Appl. No.: 18/539,653

(22) Filed: Dec. 14, 2023

(65) Prior Publication Data

US 2024/0110681 A1    Apr. 4, 2024

Related U.S. Application Data

(63) Continuation of application No. 18/311,188, filed on May 2, 2023, now Pat. No. 11,885,469.

(60) Provisional application No. 63/337,604, filed on May 2, 2022.

(51) Int. Cl.
*F21S 41/24* (2018.01)
*F21S 41/36* (2018.01)

(52) U.S. Cl.
CPC ............... *F21S 41/24* (2018.01); *F21S 41/36* (2018.01)

(58) Field of Classification Search
CPC .................................. F21S 41/24; F21S 41/36
See application file for complete search history.

(56) References Cited

U.S. PATENT DOCUMENTS

| | | | |
|---|---|---|---|
| 10,024,512 B2 | 7/2018 | Sato | |
| 10,139,074 B2* | 11/2018 | Koshiro | F21S 43/245 |
| 10,184,635 B2 | 1/2019 | Childress et al. | |
| 10,310,158 B2* | 6/2019 | Del Carmen Montano | F21S 43/50 |
| 10,480,745 B1* | 11/2019 | Li | F21S 43/315 |
| 10,557,613 B2* | 2/2020 | De Lamberterie | F21S 41/24 |
| 10,876,703 B2 | 12/2020 | Sakashita et al. | |
| 10,914,430 B2* | 2/2021 | Kraz | F21V 14/06 |
| 2008/0232127 A1* | 9/2008 | Futami | G02B 6/0038 362/511 |
| 2011/0242831 A1* | 10/2011 | Okui | F21S 43/14 362/511 |
| 2012/0051077 A1* | 3/2012 | Arai | F21S 41/24 362/516 |
| 2014/0160778 A1* | 6/2014 | Nakada | B60Q 1/2607 362/511 |
| 2015/0009696 A1* | 1/2015 | Ogata | G02B 6/001 362/511 |
| 2015/0092433 A1* | 4/2015 | Gloss | F21S 41/24 362/511 |

(Continued)

*Primary Examiner* — Bryon T Gyllstrom
(74) *Attorney, Agent, or Firm* — Brooks Kushman P.C.

(57) ABSTRACT

A light guide is provided having an elongate body extending in a longitudinal direction having a light transmission portion with a forward light exit surface and a reflective track extending opposite the light exit surface. A plurality of reflective elements are formed along the reflective track and spaced apart in the longitudinal direction. Each reflective element has a center segment and a pair of edge segments each oriented at a spread angle from the center segment toward the light transmission portion, thereby increasing a spread of light output in a horizontal direction from the light transmission portion.

20 Claims, 5 Drawing Sheets

(56) References Cited

U.S. PATENT DOCUMENTS

| | | | |
|---|---|---|---|
| 2015/0241014 A1* | 8/2015 | Leutiger | F21S 43/245 |
| | | | 362/520 |
| 2018/0112847 A1* | 4/2018 | Childress | F21S 43/14 |
| 2018/0210127 A1* | 7/2018 | Akiyama | F21S 43/247 |
| 2019/0064423 A1* | 2/2019 | McCarter | F21S 43/245 |
| 2020/0003383 A1* | 1/2020 | Takenaga | F21S 43/249 |
| 2020/0025995 A1* | 1/2020 | Mori | G02B 6/0018 |
| 2023/0046652 A1* | 2/2023 | Shin | G02F 1/133603 |
| 2023/0134384 A1* | 5/2023 | Wu | F21S 43/40 |
| | | | 362/511 |
| 2023/0176271 A1* | 6/2023 | Maier | F21S 43/14 |
| | | | 362/551 |

* cited by examiner

LIGHT GUIDE WITH MULTI-DIRECTIONAL OPTICS

CROSS-REFERENCE TO RELATED APPLICATIONS

This application is a continuation of U.S. application Ser. No. 18/311,188 filed May 2, 2023, now issued as U.S. Pat. No. 11,885,469, which, in turn, claims the benefit of U.S. provisional application Ser. No. 63/337,604 filed May 2, 2022, the disclosures of which are hereby incorporated in their entirety by reference herein.

TECHNICAL FIELD

The present application relates to light guides suitable for use in lamps, such as vehicle lamps.

BACKGROUND

Vehicle lamps may have a light source and a light guide to receive light emitted from the light source at an end surface thereof. The light guide receives the light emitted from the light source and guides the light through the light guide via total internal reflection and then directs the light to be emitted toward the front of the vehicle through an exit surface extending in a direction in which the light guide extends. In the light guide, a number of reflective elements are formed in a surface to reflect the light toward the exit surface. One example of a light guide is U.S. Pat. No. 10,876,703 by Koito.

SUMMARY

According to at least one embodiment, a lamp comprises a light guide having multi directional optics.

According to at least one embodiment, a lamp comprises a light guide having an optics portion having multiple surfaces offset at angle relative to a longitudinal axis of the light guide.

According to at least one embodiment, a vehicle lamp is provided having a lamp housing having an opening. A light-transmissive outer cover is positioned to cover the opening in the lamp housing and defining a lamp chamber therebetween. A light guide is arranged in the lamp chamber having an elongate body extending in a longitudinal direction. The elongate body has a light transmission portion and a reflective track extending from the light transmission portion. A light source is positioned adjacent at least one end of the light guide. The light guide has a plurality of reflective elements formed along the reflective track and spaced apart in the longitudinal direction, each reflective element having a center segment and a pair of edge segments, each oriented at a spread angle from the center segment toward the light transmission portion, thereby increasing a spread of light output from in a direction generally perpendicular to the longitudinal direction.

In another embodiment, the light guide is arranged generally vertically within the lamp chamber, and where the plurality of reflective elements define a light output pattern being generally horizontal and perpendicular to the longitudinal direction.

In another embodiment, the lamp comprises one of a headlamp or daytime running lamp.

In another embodiment, the edge segments have an edge prism defined by a triangle prism oriented at the spread angle from the center segment toward the light transmission portion, whereby each one of the edge segments positioned on opposite sides of the center segment increase in depth as the edge segment extends away from the center segment.

In another embodiment, a prism angle of each of the reflective elements varies along the length of the elongate body as the orientation of the longitudinal direction varies within the lamp chamber.

According to at least one embodiment, a light guide is provided having an elongate body extending in a longitudinal direction and having a cross section transverse to the longitudinal direction having a light transmission portion being generally circular and a reflective track protruding from the light transmission portion. A plurality of reflective elements are formed along the reflective track and are spaced apart in the longitudinal direction. Each reflective element has a center segment and a pair of edge segments. Each one of the edge segments is positioned on opposite sides of the center segment and increases in depth as the edge segment extends away from the center segment.

In another embodiment, the reflective elements are defined as a triangular prism, wherein the triangle prism of the center segment has a constant depth.

In another embodiment, the edge segments are oriented at a spread angle from the center segment toward the light transmission portion, thereby increasing a spread of light output in a horizontal direction from the light transmission portion.

In another embodiment, each edge prism has a front prism surface and a back prism surface, the front and back prism surfaces increasing in size as the edge segment extends away from the center segment.

In another embodiment, the light transmission portion has a generally circular cross section.

According to at least one embodiment, light guide is provided having an elongate body extending in a longitudinal direction having a light transmission portion with a forward light exit surface and a reflective track extending from the light transmission portion opposite the light exit surface. A plurality of reflective elements are formed along the reflective track and are spaced apart in the longitudinal direction. Each reflective element has a center segment and a pair of edge segments each oriented at a spread angle from the center segment toward the light transmission portion, thereby increasing a spread of light output in a horizontal direction from the light transmission portion.

In another embodiment, the reflective track extends in at least one a rearward direction to form a protrusion or extends in a forward direction to form a notch.

In another embodiment, the reflective elements are generally symmetric about a plane parallel to a central longitudinal axis of the body and the edge segments are mirror images about the central longitudinal axis.

In another embodiment, each edge prism has a front prism surface and a back prism surface, the front and back prism surfaces increasing in size as the edge segment extends away from the center segment.

In another embodiment, the triangle prism of center segment a constant depth and having a front prism surface and a back prism surface being generally equal.

In another embodiment, the spread angle is in the range of 2-degrees to 20-degrees. In another embodiment, the spread angle is in the range of 5-degrees to 15-degrees.

In another embodiment, a prism angle of the center segment is generally the same as a prism angle of the edge segments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Generally vertical light guides naturally lead to vertical spread but limited horizontal spread of the light output. This is especially problematic when trying to meet requirements for vehicle lamps such as headlamps or daytime running lamps or lighting requirements in some countries.

Figure 1:
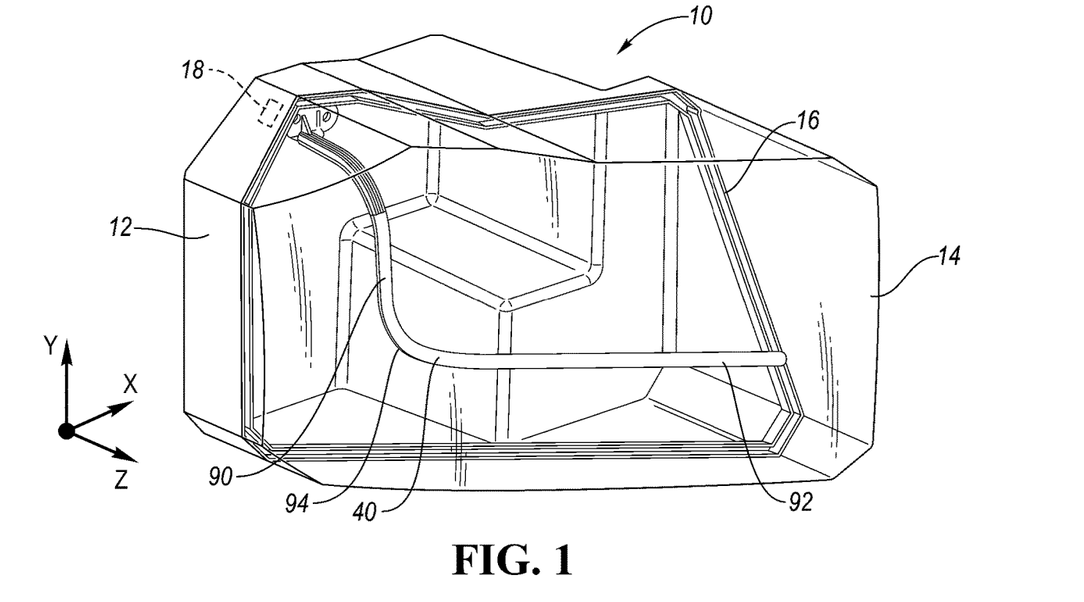
FIG. 1 is a front perspective view of a vehicle lamp having a light guide according to one embodiment of the present application.
Figure 2:
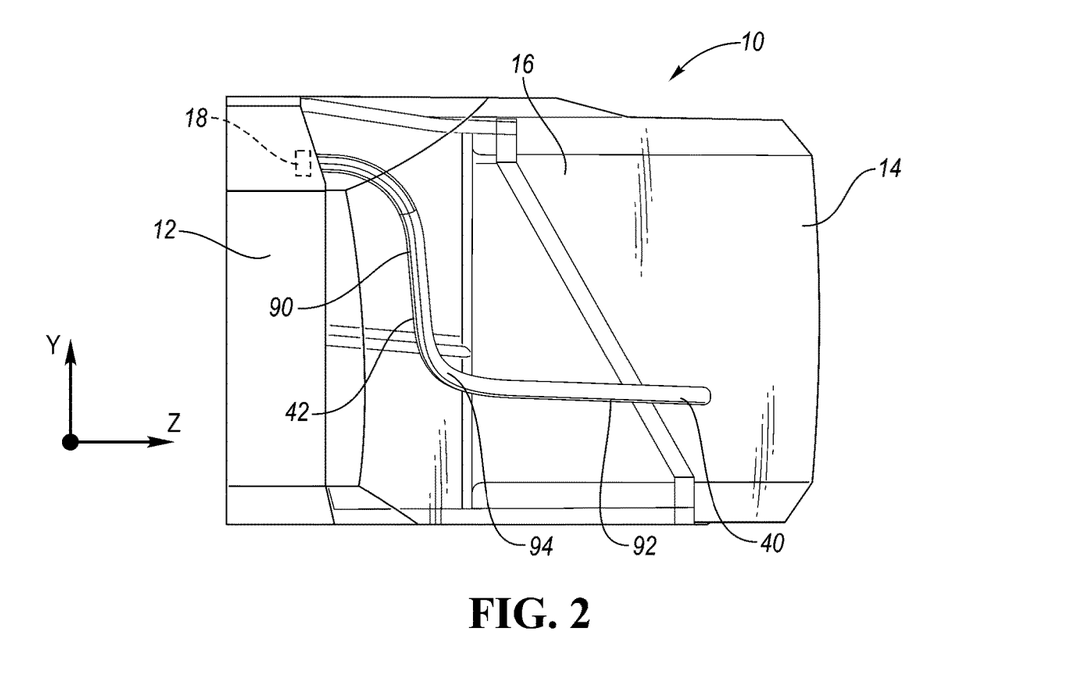
FIG. 2 is a side perspective view of the lamp in FIG. 1.

FIGS. 1-2 illustrate a vehicle lamp 10 having a light guide 40 with a plurality of reflective optics 42 for increasing the spread of the light output and increasing efficiency of the lamp along portions of the light guide 40 where styling and/or packaging require at least a portion 90 of the light guide 40 to be oriented in the upright direction. The upright portion 90 may be generally vertical in the Y-direction, and may vary from the vertical direction while still extending generally vertical, as shown in FIGS. 1-2.

According to one embodiment of the present application, the light guide 40 includes multi-directional optics 42. The multi-directional optics 42 formed along the light guide 40 increase the horizontal spread, and also increase the overall efficiency of the light guide. The multi-directional optics may also reduce cost by reducing the amount of required input flux and reducing the requirements of the light source due to the improved efficiency and control of the light output pattern.

FIG. 1 is a schematic front perspective/front view of the vehicle lamp 10 according to one embodiment. FIG. 2 is a side/perspective view of the vehicle lamp. The vehicle lamp 10 may be a headlamp or daytime running lamp mounted in a front portion of a vehicle, for example. However, the vehicle lamp 10 and light guide 40 may be used in other vehicle lamp applications such as a turn signal lamp, rear lamp, or other vehicle suitable vehicle lamps. The vehicle lamp 10 includes a lamp housing 12 defining a front opening and a light-transmissive outer cover 14 that covers the opening in the lamp housing 12 and forms a lamp chamber 16 therebetween. A light source 18 is disposed at a distal end of the elongate body of the light guide. The light source 18 and the light guide 40 are disposed in the lamp chamber 16. The light source 18 and the light guide 40 may be each fixed to the lamp housing 12 or may be mounted to other components of the lamp such as other reflectors, bezels or features of the lamp 10. In another embodiment, the lamp 10 may have a light source 18 disposed at both ends of the elongate body of the light guide 40.

The light source 18 is a light-emitting diode (LED), for example. Alternatively, the light source 108 may be a laser diode (LD), another semiconductor light-emitting element such as an organic or inorganic electroluminescent (EL) element, an incandescent lamp, a halogen lamp, a discharge lamp, or other suitable light source.

Figure 3:
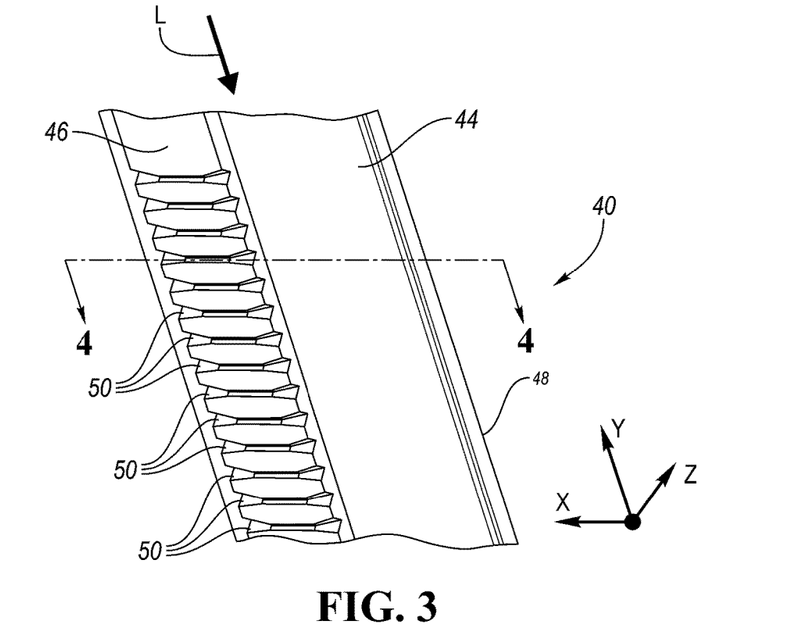
FIG. 3 is a perspective view of the light guide in FIGS. 1-2 according to one aspect of the present application.

As shown in more detail in FIG. 3, the light guide 40 is a conduit made of transparent material, such as glass or plastic, which is capable of channeling light from one end to the other through total internal reflection (TIR). The light guide 40 has an elongate body extending in a longitudinal direction L, whereas the longitudinal direction is generally parallel to the direction of light propagated via TIR within the light guide 40. The elongated light guide 40 is formed of a light transmission portion 44 and a reflective track 46 extending in the longitudinal direction along the length of the light guide 40. As shown in FIGS. 1-2, the orientation of the light guide 40 may vary along the length.

Figure 4:
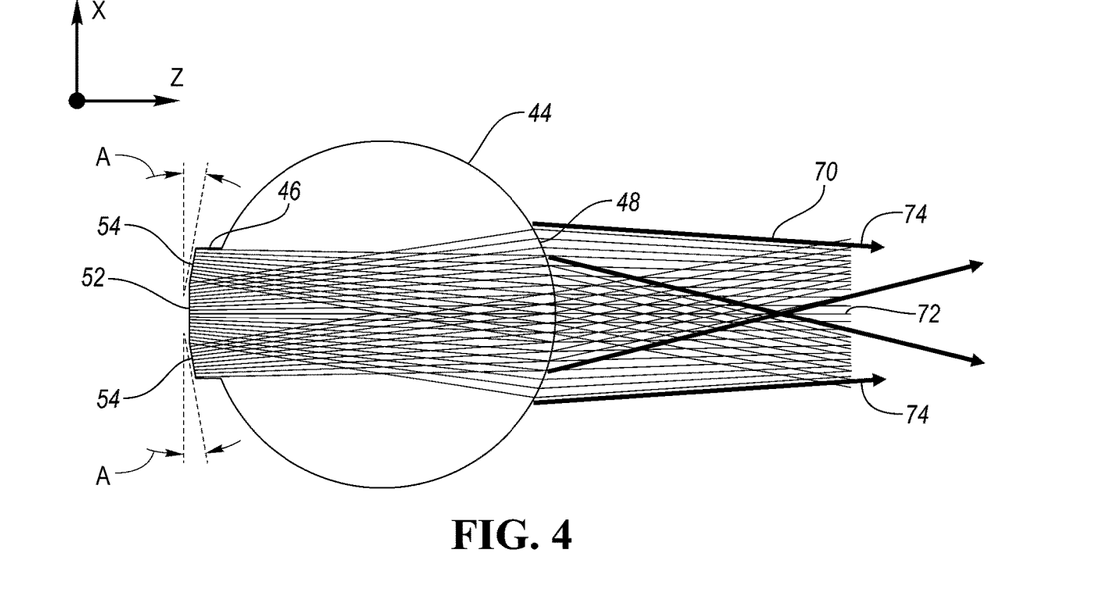
FIG. 4 is a section-view of the light guide in FIG. 3 along section lines 4-4 and including light ray traces according to one aspect of the present application.

FIG. 4 shows a cross-section taken along line 4-4 (FIG. 3) which is transverse to the longitudinal direction L. As shown in FIG. 4, the light transmission portion 44 has a generally circular cross-section and the reflective track 46 protrudes rearward from the light transmission portion 44. Light is emitted from the light guide 40 in the longitudinal direction L and is directed forward through a forward exit surface 48 by a plurality of reflective elements 50 are formed along the reflective track 46. However, the transmission portion 44 may have other suitable cross-section shapes that allow for light propagation from the light source 18 through total internal reflection (TIR) along the longitudinal direction L of the light guide 40. In another embodiment, the reflective track 46 may extend inward into the transmission portion 44, thereby forming a notch.

The plurality of reflective elements 50 are formed along the reflective track 46. The reflective elements 50 are spaced apart in the longitudinal direction. Each reflective element 50 has a center segment 52 and a pair of edge segments 54. The edge segments 54 are positioned on opposite sides of the center segment 52. The edge segments 54 may each have generally the same dimension. However, each of the edge segments 54 may have different dimensions or configurations depending on the desired light output pattern.

Figure 8:
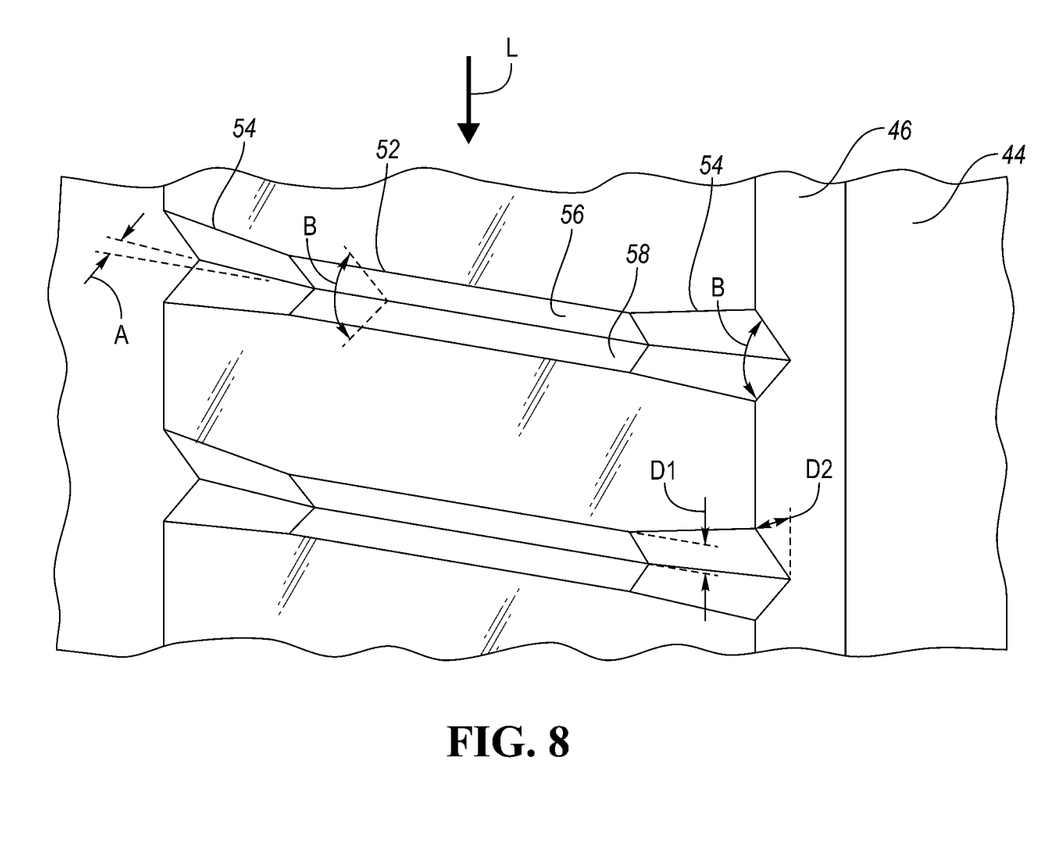
FIG. 8 is a detailed view of a portion of the light guide according to one aspect of the present application.

As shown in more detail in FIG. 8, the reflective elements 50 are formed as generally triangular prisms. The reflective elements 50 have a front prism surface 56 and a back prism surface 58. The center segment 52 is formed as a triangular prism having a constant depth. In one example, front prism surface 56 and the back prism surface 58 may be asymmetric and be oriented at different angles relative to the direction of light. In another embodiment, the triangular prisms of the reflective elements 50 are symmetric about a plane perpendicular to the longitudinal direction surface being generally equal.

The dimensions and orientations of the front prism surface 56 and the back prism surface 58 may vary along the length of the light guide 40 as the orientation of the light guide 40 varies relative to a vertical and horizontal orientations, or the desired light output direction, or other lamp variable.

The edge segments 54 are also shaped as triangular prisms and increase in depth as the edge segment extends away from the center segment 52. Along the edge segments 54, the front prism surface 56 and back prism surface 58 increase in size as the edge segment 54 extends away from the center segment 52. For example, the center segment 52 may have a constant depth of 0.17 mm and the edge segment 54 increases in depth to 0.22 mm. Other dimensions may be suitable based on the desired light output pattern. The dimensions of the center segment 52 and edge segment 54 may also vary along the length of the light guide 40 as the orientation of the light guide 40 varies relative to a vertical and horizontal orientations, or the desired light output direction, or other lamp variable. The reflective elements 50 may be generally symmetric about a plane parallel to the central longitudinal axis such that the edge segments 54 are mirror images of each other.

In this example, the light guide 40 may have a light transmission portion 44 having a diameter of approximately 7-9 millimeters (mm) and a reflective track that extends approximately 0.5-1 mm. In another embodiment, the light transmission portion 44 may have a diameter of approximately 6-12 mm and a reflective track that extends approximately 0.3-4 mm. The transmission portion 44 and reflective track 46 may have any suitable dimensions depending on the application, output requirements, styling or other factors.

The prism angle B of each of the reflective element surfaces may also vary along the length of the light guide 40. The prism angle of the center segment 52 is generally the same as a prism angle of the edge segments 54. The prism angle B between the front and back prism surfaces 56, 58 may be in the range of 15-degrees to 75-degrees. In another embodiment, the prism angle B of the center segment 52 is different than a prism angle B of the edge segments 54.

The edge segments 54 have an edge prism defined by a triangle prism oriented at a spread angle A from the center segment 52 toward the light transmission portion 44, thereby increasing the spread of light output in a horizontal direction from the light transmission portion. The spread angle A may be in the range of 2-degrees to 20-degrees. While the spread angle A may be optimized for different output light patterns, at a spread angle greater than 20-degree, the light pattern may begin to separate.

In another embodiment, the spread angle is in the range of 5-degrees to 15-degrees. The spread angle A may also vary along the longitudinal length of the light guide 40. In another example, the multi-surfaced edge segments 54 may be rotated at an angle A of approximately 10-degrees.

Figure 6:
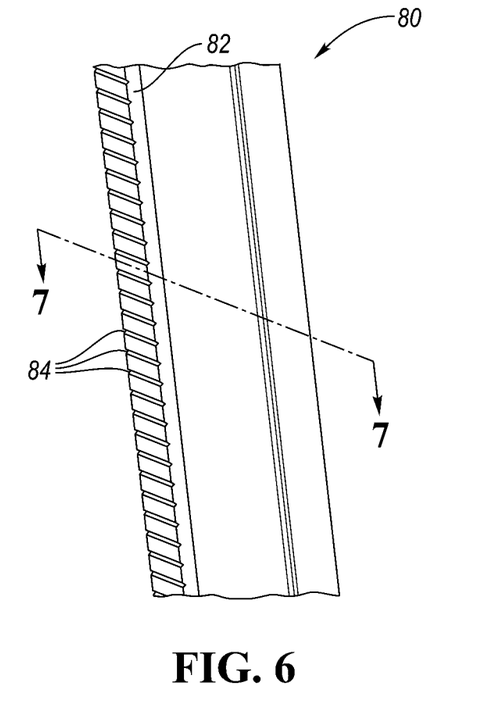
FIG. 6 is perspective view of an example of a light guide based on current technology.
Figure 7:
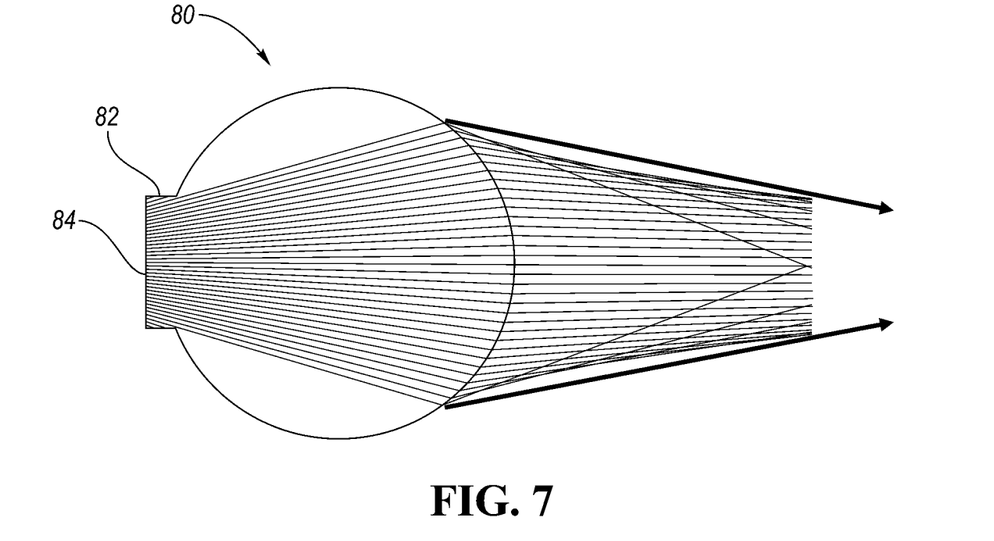
FIG. 7 is a section-view of the light guide in FIG. 8 along section lines 9-9 and including light ray traces.

As shown in FIGS. 6-7, standard light guides 80 use a single flat track surface 82 with the prism optics 84. The conventional method of increasing horizontal spread is to widen the optics track 82, which leads to reduced efficiency.

Figure 5:
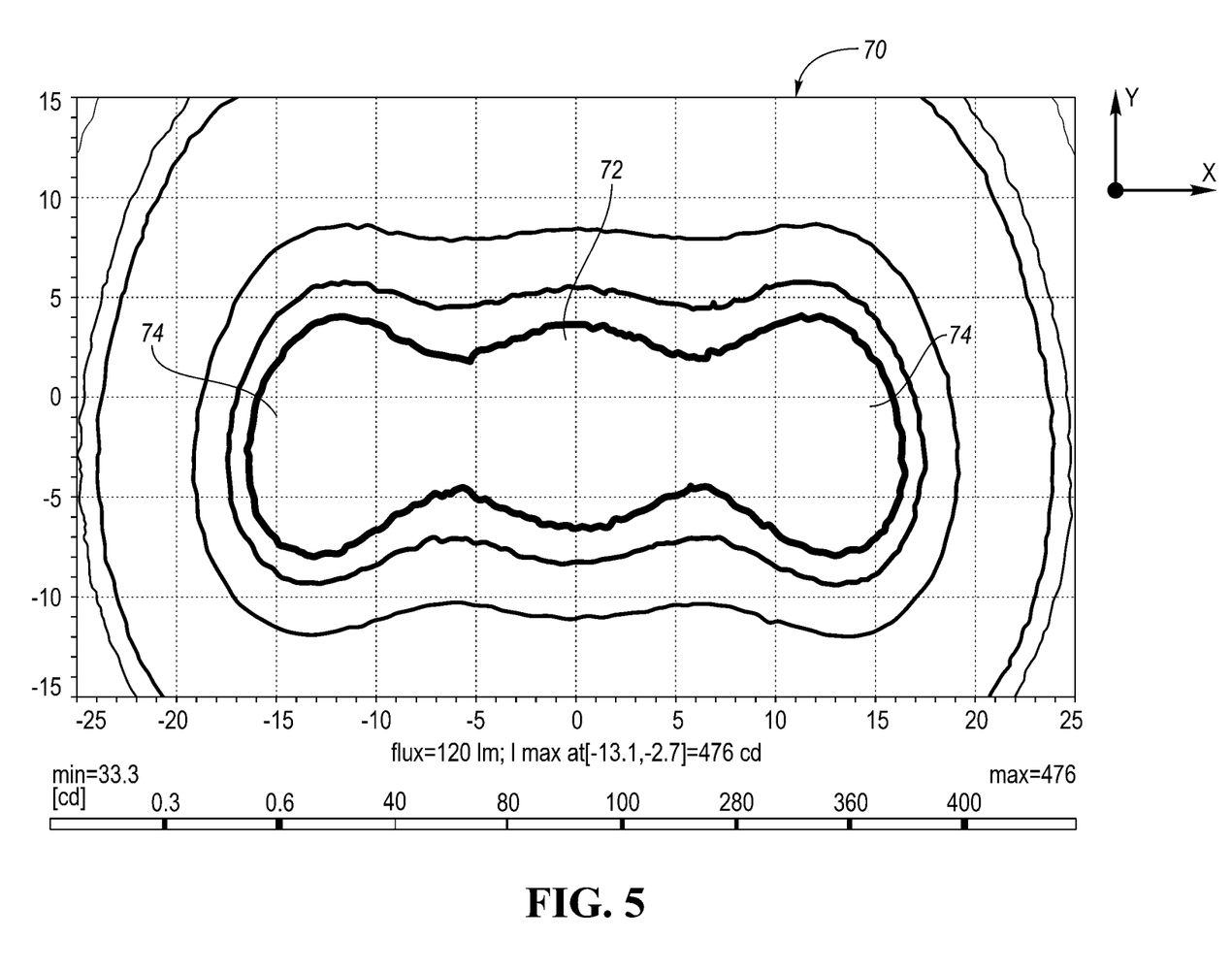
FIG. 5 is an iso-plot of the light output pattern of the light guide according to one aspect of the application.

The light guide 40 with multi-directional optics creates light pattern 70 with increased perpendicular spread, as shown in FIGS. 4-5. The light pattern 70 may include a central region 72 and hot spots 74 that extend the horizontal spread for light guides that are oriented in the upright direction or extending generally vertically in the Y-direction. The light pattern 70 not only increases horizontal spread to meet standards, the output also increases in efficiency. In this example, efficiency increased by 11%. The horizonal width and efficiency are increased by having more control over the spread of the light. The ray traces in FIG. 4 illustrate the levels of spread with the light guide having multi-directional optics, compared to prior solutions (FIG. 7).

The multi-directional optics 42 increase the spread of the light pattern in a direction perpendicular to the longitudinal direction L of the light guide 40. In the example shown in FIGS. 1-2 the reflective elements 50 are formed primarily on the upright portion 90 of the light guide 40 oriented vertically, thereby increasing the horizonal light spread, as shown in FIGS. 4-5. The horizonal portion 92 of the light guide 40 that extends generally in the horizontal X-direction may not include multi-directional optics 42 and may only have standard optics 84, for example. The dimensions of the multi-directional optics 42, including the reflective elements 50, center segments 52, edge segments 54 and angles A, B, may vary as the light guide 40 orientation and curvature changes. This may be particularly evident along a curved portion 94, although the dimensions of the multi-directional optics 42 may also vary along the length of the upright portion 90.

Multi-directional optics are a unique way to improve light guide pattern, performance, and efficiency by increasing the perpendicular spread and having more control of the optics. Increased efficiency will reduce cost by decreasing design time and required input flux.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A light guide comprising:
   an elongate body extending in a longitudinal direction, the elongate body having a light transmission portion and a reflective track; and
   wherein the light guide has a plurality of reflective elements formed along the reflective track and spaced apart in the longitudinal direction, each reflective element having a center segment and a pair of edge segments oriented at a spread angle from the center segment toward the light transmission portion, thereby increasing a spread of light output from in a direction generally perpendicular to the longitudinal direction.

2. The light guide according to claim 1, wherein each one of the edge segments have an edge prism oriented at the spread angle from the center segment toward the light transmission portion, whereby each one of the edge segments is positioned on opposite sides of the center segment increase in depth as each one of the edge segments extends away from the center segment.

3. The light guide according to claim 2, wherein a prism angle of each of the edge prisms varies along the longitudinal direction of the elongate body.

4. The light guide according to claim 1, wherein the elongate body has a cross section transverse to the longitudinal direction being generally circular and the reflective track protrudes from the light transmission portion.

5. The light guide according to claim 4, wherein the reflective track protrudes rearward from the light transmission portion and has a generally rectangular cross-section.

6. The light guide according to claim 1, wherein the center segment of each of the plurality of reflective elements is defined as a triangular prism, wherein the triangular prism of the center segment has a constant depth in a horizontal direction.

7. The light guide according to claim 1, wherein each one of the edge segments are oriented at the spread angle from the center segment toward the light transmission portion, thereby increasing a spread of light output in a horizontal direction from the light transmission portion.

8. The light guide of claim 1 wherein the light transmission portion has a forward light exit surface and the reflective track extends from the light transmission portion opposite the forrward light exit surface.

9. The light guide according to claim 8, wherein the reflective elements are generally symmetric about a plane parallel to a central longitudinal axis of the body and the edge segments are mirror images about the central longitudinal axis.

10. The light guide according to claim 1, wherein each one of the edge segments increase in depth as each of the edge segments extends away from the center segment at the spread angle.

11. The light guide according to claim 1, wherein the reflective track extending in at least one of a rearward direction to form a protrusion or extending in a forward direction to form a notch.

12. A vehicle lamp, comprising:
a light guide according to claim 1;
a lamp chamber defined between a lamp housing; and
a light-transmissive outer cover,
wherein the light guide is arranged in the lamp chamber.

13. The vehicle lamp of claim 12, wherein the light guide is arranged generally vertically within the lamp chamber.

14. The vehicle lamp of claim 12, wherein the plurality of reflective elements define a light output pattern of the lamp being generally horizontal and perpendicular to the longitudinal direction.

15. The vehicle lamp of claim 12, wherein the lamp comprises one of a headlamp or daytime running lamp.

16. A light guide comprising:
an elongate body extending in a longitudinal direction, the elongate body having a light transmission portion and a reflective track protruding from the light transmission portion; and
at least one reflective element formed along the reflective track and having a center segment and a pair of edge segments oriented at a spread angle from the center segment toward the light transmission portion, thereby increasing a spread of light output from in a direction generally perpendicular to the longitudinal direction.

17. The light guide according to claim 16, wherein the pair of edge segments have an edge prism oriented at the spread angle from the center segment toward the light transmission portion.

18. The light guide according to claim 16, whereby each one of the edge segments is positioned on opposite sides of the center segment increase in depth as each one of the edge segments extends away from the center segment.

19. The light guide according to claim 16, wherein the at least one reflective element comprises a plurality of reflective elements positioned along the reflective track.

20. The light guide according to claim 19, wherein the spread angle varies along the longitudinal direction of the elongate body for each one of the pair of edge segments for each of the plurality of reflective elements.

* * * * *